(12) United States Patent
Williams et al.

(10) Patent No.: US 7,122,135 B2
(45) Date of Patent: Oct. 17, 2006

(54) BLEND OF ORGANOPHOSPHORUS FLAME RETARDANT, LACTONE STABILIZER, AND PHOSPHATE COMPATIBILIZER

(75) Inventors: Barbara A. Williams, New York, NY (US); Lambertus A. DeKleine, Hengelo (NL)

(73) Assignee: Supresta U.S. LLC, Ardsley, NY (US)

( * ) Notice: Subject to any disclaimer, the term of this patent is extended or adjusted under 35 U.S.C. 154(b) by 489 days.

(21) Appl. No.: 10/433,968

(22) PCT Filed: Nov. 13, 2001

(86) PCT No.: PCT/US01/51604

§ 371 (c)(1),
(2), (4) Date: Jun. 9, 2003

(87) PCT Pub. No.: WO02/079315

PCT Pub. Date: Oct. 10, 2002

(65) Prior Publication Data

US 2005/0107500 A1    May 19, 2005

(51) Int. Cl.
*C09K 21/12* (2006.01)
*C09K 21/14* (2006.01)
*C08K 5/521* (2006.01)
*C08G 18/00* (2006.01)

(52) U.S. Cl. .................. 252/609; 521/107; 521/155; 521/168; 521/169; 521/170; 521/906; 524/590; 524/86; 524/96; 524/111

(58) Field of Classification Search ................ 252/609
See application file for complete search history.

(56) References Cited

U.S. PATENT DOCUMENTS

| | | | | |
|---|---|---|---|---|
| 4,097,560 A | * | 6/1978 | Littman et al. | 106/18.18 |
| 4,324,865 A | * | 4/1982 | Reale | 521/107 |
| 4,382,042 A | * | 5/1983 | Hardy et al. | 558/115 |
| 4,458,035 A | * | 7/1984 | Hardy et al. | 521/107 |
| 4,794,126 A | * | 12/1988 | Fesman et al. | 521/117 |
| 4,963,593 A | * | 10/1990 | Ricciardi et al. | 521/128 |
| 5,204,394 A | | 4/1993 | Gosens et al. | 524/125 |
| 5,308,899 A | | 5/1994 | Michaelis | 524/109 |
| 5,367,008 A | | 11/1994 | Nesvadba | 524/111 |
| 5,369,159 A | | 11/1994 | Nesvadba | 524/111 |
| 5,422,415 A | | 6/1995 | Michaelis | 128/85 |
| 5,428,162 A | | 6/1995 | Nesvadba | 544/221 |
| 5,516,920 A | | 5/1996 | Nesvadba et al. | 549/307 |
| 5,621,029 A | | 4/1997 | Eckel et al. | 524/127 |
| 5,844,026 A | | 12/1998 | Galbo et al. | 524/100 |
| 5,869,565 A | | 2/1999 | Clauss | 524/590 |
| 6,262,135 B1 | * | 7/2001 | Bradford et al. | 521/107 |
| 6,268,418 B1 | | 7/2001 | Magerstedt et al. | 524/125 |
| 6,319,962 B1 | * | 11/2001 | Singh et al. | 521/170 |

FOREIGN PATENT DOCUMENTS

| | | |
|---|---|---|
| EP | 867467 | 9/1998 |
| WO | 99/03915 | 1/1999 |
| WO | 99/67223 | 12/1999 |

OTHER PUBLICATIONS

Abstract of JP Pat. Publication No. 2000/154289 (2000).
Product Brochure for FYROL PNX-S (Aug. 2000).
J. Kenny, "Further Use of Lactone chemistry to Improve Performance Cost Profile of Traditional Antioxidant Stabilization Systems", Polymers & Polymer Composites, vol. 8, No. 1, pp. 37-50 (2000).
Additives for Polymers (Sep. 2000), Technical Briefs: New Developments in Lactone-Based Stabilizers, pp. 8-10.

* cited by examiner

*Primary Examiner*—Joseph D. Anthony
(74) *Attorney, Agent, or Firm*—Dilworth & Barrese, LLP

(57) ABSTRACT

A flame retardant blend, suitable for incorporation into a polyurethane foam, comprises: an oligomeric organophosphorus flame retardant, preferably an organophosphate, having a phosphorus content of no less than about 10%; a benzofuran-2-one stabilizer; and a monomeric phosphate ester containing alkyl and/or haloalkyl groups to act as a solubilizing addtive for the oligomeric organophosphorus flame retardant and benzofuran-2-one stabilizer.

10 Claims, No Drawings

BLEND OF ORGANOPHOSPHORUS FLAME RETARDANT, LACTONE STABILIZER, AND PHOSPHATE COMPATIBILIZER

The present invention relates to the combination of three components in a flame retardant additive formulation that, when incorporated in a polyurethane foam, results in a considerable reduction in the discoloration (also referred to as "scorch") of that polyurethane foam as to compared to when only the two organophosphorus components of the combination are employed. In addition, the present invention relates to the use of a solubilizing monomeric phosphate ester component with a combination of an organophosphorus flame retardant, which in certain embodiments can be an oligomeric phosphate ester, and a benzofuran-2-one (or "lactone") stabilizer. The presence of this solubilizing component retards the normal solution instability that would be observed, over time, if just the organophosphorus flame retardant and benzofuran-2-one stabilizer were used together. Other advantages of the solubilizing component (for example, PHOSFLEX® TBEP brand from Akzo Nobel Functional Chemicals) are that the viscosity is reduced when an oligomeric organophosphorus flame retardant is used and, unlike other flammable compatibilizers, the flame retardant performance is not influenced to an appreciable degree. The more solution-stable composition of the present invention allows for a reduction of scorch, which normally occurs, for example, when a phosphate ester flame retardant is used, in low-density polyurethane flexible foams.

An essential component in the flame retardant blend of the present invention is an organophosphorus flame retardant which is present in a predominant amount compared to the other two components of the three part flame retardant blend of this invention. The amount of the organophosphrus additive in the blend will range from about 60% to about 98%, by weight of the blend, more preferably from about 80% to about 96%.

The organophosphorus flame retardant can be a monomeric phosphate ester of the type conventionally used which has the formula $O=P(OR)_3$, where R is selected from alkyl and haloalkyl groups having from 1 to about 6 carbon atoms in such groups. Representative examples of such flame retardants include tris(dichloroisopropyl)phosphate, tris(2-chloroisopropyl) phosphate, and tris(2-chloroethyl) phosphate.

Alternatively, the organophosphorus flame retardant component can be an oligomeric organophosphorus flame retardant, preferably having a phosphorus content of no less than about 5%, by weight and, in preferred embodiments when an organophosphate is desired, at least three phosphate ester units therein (i.e., at least two phosphate ester repeat units and a phosphate capping unit). The term "oligomeric" as used herein is meant to exclude either monomeric or dimeric species. A representative organophosphorus additive of this type is generally described in U.S. Pat. No. 4,382,042 to T. A. Hardy with the non-halogenated versions being preferred (e.g., especially the ethyl group-containing composition). These preferred organophosphate oligomers can be formed by reacting phosphorus pentoxide with the selected trialkyl phosphate (e.g., triethyl phosphate) to form a polyphosphate ester containing P—O—P bonds that is then reacted with epoxide (e.g., ethylene oxide) to form the desired product. This preferred oligomeric organophosphate flame retardant is of the formula:

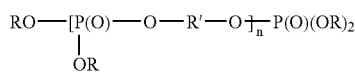

where n (which designates the "repeat" phosphate ester units) can range, on a number average basis, from 2 to about 20, preferably from 2 to about 10, and R is selected from the group consisting of alkyl and hydroxyalkyl and R' is alkylene. The alkyl and alkylene groups will generally contain from about two to about ten carbon atoms.

Especially preferred oligomeric phosphates for use herein will comprise ethyl and ethylene groups as the alkyl and alkylene moieties, will have a hydroxy functionality of no more than about 30 mg KOH/g, will have an acid number of no more than about 2.5 mg KOH/g, and will have a phosphorus content that ranges from about 15% to about 25%, by weight. It is referred to herein after as "PEEOP" (or "poly(ethyl ethyleneoxy) phosphate").

It is within the contemplation of the present invention to utilize oligomeric phosphonate-containing materials as component (b). Both substantially pure phosphonate and phosphonate/phosphate compositions are intended to be included. These have the same structure as depicted above for the oligomeric phosphate species with the exception that the internal (bracketed) RO— on the left side of the structure may be R— and one of the terminal —OR structures on the right side of the formula may be —R. A representative and commercially available example of an additive of this type is FYROL 51 from Akzo Nobel Chemicals Inc. which is made by a multistep process from dimethyl methylphosphonate, phosphorus pentoxide, ethylene glycol, and ethylene oxide.

The product "FYROL® PNX" is a preferred product of this type for use herein. It is an oligomeric phosphate ester (CAS # 184538-58-7) of the formula:

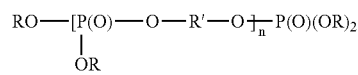

where n (which designates the "repeat" phosphate ester units) is, on a number average basis, of from about 2 to about 20, R is ethyl, and R' is ethylene. This preferred has a phosphorus content of about 19 wt % and a viscosity at 25° C. of about 2000 mPa.s.

The second essential component of the flame retardant blend of the present invention is of the type of benzofuran-2-one stabilizer that is described in U.S. Pat. No. 5,869,565, which is incorporated herein by reference for its illustration of such an additive. The structure of this class of stabilizer is provided in the following formulae:

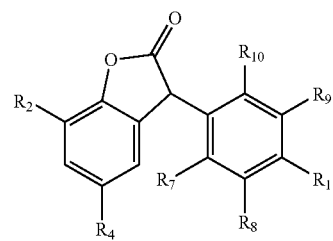

wherein either two of $R_1$, $R_7$, $R_8$, $R_9$ and $R_{10}$ are each independently of the other $C_1$–$C_4$ alkyl or $C_1$–$C_4$ alkoxy, the others being hydrogen, or $R_7$ to $R_{10}$ are hydrogen, or at most two of these radicals are each independently of the other methyl or methoxy, and $R_1$ is —O—$CHR_3$—$CHR_5$—O—CO—$R_6$, $R_2$ and $R_4$ are each independently of the other hydrogen or $C_1$–$C_6$ alkyl, $R_3$ is hydrogen or $C_1$–$C_4$ alkyl, $R_5$ is hydrogen, phenyl or $C_1$–$C_6$ alkyl, and $R_6$ is $C_1$–$C_4$ alkyl. The HP-136 brand product from Ciba Specialty Chemicals is a preferred species for use herein and is (5,7-di-t-butyl-3(3,4 dimethylphenyl)-3H-benzofuran-2-one, wherein $R_2$ and $R_4$ are each t-butyl and two of $R_1$, $R_7$, $R_8$, $R_9$ and $R_{10}$ are each methyl. This stabilizer component is present in the flame retardant blend of the present invention at from about 0.05% to about 1.0%, by weight of the blend, more preferably from about 0.2% to about 0.5%.

The third essential component of the blend is a monomeric phosphate ester of the formula O=P—(OR)$_3$, where R is independently selected from alkyl, alkoxyalkyl, or haloalkyl containing up to about 8 carbon atoms in the alkyl, alkoxyalkyl and/or haloalkyl groups. It is present at from about 1% to about 40%, by weight of the blend, more preferably from about 1% to about 20%. Preferred are substituents that are halogenated (e.g., chlorinated) or alkoxyalkyl with the carbon atom content in the substituent being between one and four carbon atoms. Representative compounds of this type that can be selected include tributoxyethyl phosphate, tri(1,3 dichloroisopropyl) phosphate, tributyl phosphate, tri(2-chloroethyl)phosphate, triethylphosphate, tri(2-chloroisopropyl)phosphate, isopropylated triarylphosphate, and a tert-butylated triphenyl phosphate mixture. While it is possible to select a monomeric phosphate compatibilizers from the same general type of organophosphorus compound that could be selected for the predominant component of this invention (which will normally be a compound that does not form a compatible blend with the benzo-2-furanone stabilizer, the present invention contemplates that a differing compound from within that class will be selected so that there are three components in the flame retardant blend.

The previously described flame retardant blend can be incorporated in conventional polyurethane foams at use levels of up to about 24 parts by weight per one hundred parts of polyol (which will normally contain antioxidants for scorch inhiubition) to confer the desired degree of flame retardancy and antiscorch behavior on those foams.

The present invention is further described by the Examples that follow.

EXAMPLES

System 1, which is described below, uses FYROL® 38 as a solubilizer for the lactone additive HP-136 with FYROL® PNX. System 2 uses a phosphate ester, PHOSFLEX® TBEP as a solubilizer for HP-136 with the FYROL® PNX material.

A microwave oven test method was used as a means to determine the degree of discoloration in the tested foams with a numerical scale of 1 to 5 being used to assign the degree of scorch present in the foam. A value of 1 was assigned to a white foam control showing no discoloration, whereas the value of 5 was assigned to a very dark brown scorch pattern. The values increased from 1 to 5 with increasing discoloration. Foams prepared with either system (flame retardant, solubilizer, and lactone additive) produced foams with a 1.5 to 2.0 rating, whereas without the use of the HP-136 lactone stabilizer the level of scorch was rated at 2.5 to 3.0. The nominal density was 1.20 pcf (pounds per cubic foot). This microwave test method is described in the Journal of Cellular Plastics (December 1979) in an article entitled "A Rapid Predictive Test for Urethane Foam Scorch" by Reale and Jacobs.

The following Examples illustrate the formulations used to produce flexible foams.

TABLE A

| System 1 | | |
|---|---|---|
| Polyether Polyol (3000 mw) from Arco | 100.0 | 100.0 |
| System 1* | 9.0 | |
| FYROL ® PNX | (2.23) | 5.00 |
| FYROL ® 38 (solubilizer) | (6.68) | — |
| Ciba's HP-136 Lactone | (0.09) | — |
| H$_2$O | 5.0 | 5.0 |
| Dabco 33LV/A-1 (3:1) ratio from OSi | 0.22 | 0.22 |
| Silicone surfactant L-620 from OSi | 1.0 | 1.0 |
| Stannous Octoate T-10 from Air Products | 0.30 | 0.30 |
| Toluene Diisocyanate TDI from Bayer | 60.0 | 60.0 |
| TDI Index | 110 | 110 |

*the three components of System 1, which included FYROL PNX, solubilizer and HP-136, were heated at 70° C. for four hours

TABLE A-1

| Polyether Polyol (3000 mw) from Arco | 100.0 | 100.0 |
|---|---|---|
| FYROL ® PNX | 4.95 | 5.00 |
| Ciba's HP-136 Lactone | 0.05 | — |
| H$_2$O | 5.0 | 5.0 |
| Dabco 33LV/A-1 (3:1) ratio from OSi | 0.22 | 0.22 |
| Silicone surfactant L-620 from OSi | 1.0 | 1.0 |
| Stannous Octoate T-10 from Air Products | 0.30 | 0.30 |
| Toluene Diisocyanate TDI from Bayer | 60.0 | 60.0 |
| TDI Index | 110 | 110 |

Fyrol ® PNX mixed with only HP-136 was difficult to dissolve and did not form a clear, stable solution; therefore, a compatibilizer or solubilizer, in accordance with the present invention, was necessary to maintain a stable solution.

The formulation components mentioned in Table A, above, were combined and poured into a (8.0"×8.0"×5.0") box and allowed to rise freely. The foam was then placed in a GE PROFILE SENSOR microwave oven and heated for one hundred and twenty seconds. The foam was removed from the oven. It was cooled to room temperature for two hours. The foam bun was cut into a 1 inch slice in a perpendicular to rise direction and was examined for its discoloration rating.

The performance of system 1 using the FYROL PNX oligomeric organophosphate, lactone stabilizer (HP-136, whose active ingredient is 5,7-di-t-butyl-3-(3,4-dimethylphenyl)-3H-benzofuran-2-one) and the phosphate ester FYROL® 38 is tri[1,3 dichloroisopropyl]phosphate with an antioxidant package (as described in U.S. Pat. No. 4,477,600) is provided in Table B:

TABLE B

| | | System 1 | | | |
|---|---|---|---|---|---|
| SAMPLE | 1 | 1A (Duplicate) | 2 (Control) | 3 | 4 (Control) |
| System 1 | FYROL® PNX FYROL® 38 HP-136 | FYROL® PNX FYROL® 38 HP-136 | FYROL® PNX FYROL® 38 (No HP-136) | FYROL® PNX HP-136 | FYROL® PNX (No HP-136) |
| Color Rating | 2.0 | 1.5 | 3 | 2 | 3 |

In the runs reported for Table B the weight ratio of FYROL PNX to phosphate ester was 25:75 and the 9.0 parts refers to the parts per weight of this combination per 100 parts by weight of polyol used to make the foam. The weight percentage of antioxidant, when present, was 1.0%, based on the weight of the flame retardant and the solubilizer. In Run 3 in Table B where Fyrol® PNX was mixed only with the HP-136 lactone, it was difficult to dissolve and a clear, stable solution was not formed.

The following Example illustrates the formulation used to produce the present flexible foams.

A second set of foams was produced using system 2 but the scorch characteristics of the foams were measured using a calorimeter (namely, the DR LANGE Micro Color apparatus).

TABLE C

| System 2 | |
|---|---|
| Polyether Polyol (3000 mw) from Shell | 100.0 |
| System 2* | 8.0 |
| FYROL® PNX | 7.60 |
| FYROL® TBEP (solubilizer) | 0.38 |
| Ciba's HP-136 Lactone | 0.02 |
| H$_2$O | 4.80 |
| Dabco 33LV/A-1 3:1 from OSi | 0.24 |
| Silicone surfactant Dabco 5125 from OSi | 1.0 |
| Stannous Octoate T-10 from Air Products | 0.36 |
| Toluene Diisocyanate TDI from Bayer | 58.9 |
| TDI Index | 110 |

The performance of system 2 using FYROL® PNX (the oligomeric organophosphate), the lactone stabilizer (HP-136), whose active ingredient is 5,7-di-t-butyl-3-(3,4-dimethylphenyl)-3H-benzofuran-2-one) and the phosphate ester solubilizer, PHOSFLEX® T-BEP (tributoxyethyl phosphate), is provided in Table D:

TABLE D

| | System 2 | |
|---|---|---|
| SAMPLE | 1 | 2 |
| System 2 | FYROL® PNX PHOSFLEX® TBEP | FYROL® PNX PHOSFLEX® TBEP |
| Antioxidant | HP-136 at 0.25% | None |
| Colorimeter reading (b*) | *6.7 | *23.7 | b* = yellowness, with a lower number being indicative of a less colored foam.

In the runs reported for Table D the weight ratio of FYROL PNX to phosphate ester was 95:5 and the 8.0 parts refers to the parts per weight of this combination per 100 parts by weight of polyol used to make the foam. The weight percentage of HP-136 brand antioxidant, when used in system 2, was 0.25%, based on the weight of the flame retardant and the solubilizer.

The foregoing Examples, since they are presented to merely exemplify the present invention, should not be construed in a limiting sense. The scope of protection that is desired is set forth in the claims that follow.

What is claimed is:

1. A flame retardant composition which comprises: from about 60% to about 98%, by weight of the flame retardant composition, of an oligomeric organophosphorus retardant which is a phosphate ester containing at least three phosphate ester units therein; from about 0.05% to about 1.0%, by weight of the flame retardant composition, of a benzofuran-2-one stabilizer; and from about 1% to about 40%, by weight of the flame retardant composition, of a monomeric phosphate ester compatibilizer.

2. A composition as claimed in claim 1 wherein the monomeric phosphate ester compatibilizer is tributoxyethyl phosphate.

3. A flame retardant composition which comprises: from about 80% to about 98%, by weight of an oligomeric organophosphorus flame retardant which is a phosphate ester containing at least three phosphate ester units therein; from about 0.05% to about 1.0%, by weight of a benzofuran-2-one stabilizer; and from about 1% to about 40%, by weight of a monomeric phosphate ester compatibilizer.

4. A composition as claimed in claim 3 wherein the phosphate ester is of the formula

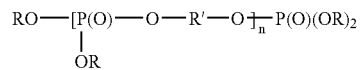

wherein n is, on a number average basis, of from about 2 to about 20, R is ethyl, and R' is ethylene.

5. A composition as claimed in claim 3 wherein the benzofuran-2-one stabilizer has the formula

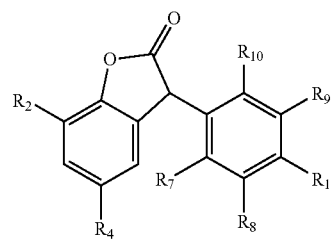

wherein either two of $R_1$, $R_7$, $R_8$, $R_9$ and $R_{10}$ are each independently of the other $C_1$–$C_4$ alkyl or $C_1$–$C_4$ alkoxy, the others being hydrogen, or $R_7$ to $R_{10}$ are hydrogen, or at most two of these radicals are each independently of the other methyl or methoxy, and $R_1$ is —O—$CHR_3$—$CHR_5$—O—CO—$R_6$, $R_2$ and $R_4$ are each independently of the other hydrogen or $C_1$–$C_6$ alkyl, $R_3$ is hydrogen or $C_1$–$C_4$ alkyl, $R_5$ is hydrogen, phenyl or $C_1$–$C_6$ alkyl, and $R_6$ is $C_1$–$C_4$ alkyl.

6. A composition as claimed in claim 5 wherein the benzofuran-2-one stabilizer is (5,7-di-t-butyl-3(3,4 dimethyiphenyl)-3H-benzofuran-2-one.

7. A composition as claimed in claim 3 wherein the monomeric phosphate ester compatibilizer is of the formula O═P—(OR)$_3$, where R is independently selected from alkyl, alkoxyalkyl, or haloalkyl containing up to about 8 carbon atoms in the alkyl, alkoxyalkyl and/or haloalkyl groups.

8. A composition as claimed in claim 3 wherein the organophosphorus flame retardant is a monomeric phosphate ester having the formula O═P(OR)$_3$, where R is selected from alkyl and haloalkyl groups having from 1 to about 8 carbon atoms in such groups.

9. A composition as claimed in claim 3 wherein the monomeric phosphate ester compatibilizer is tributoxyethyl phosphate.

10. A flame retarded polyurethane foam that comprises the composition of any of claims 1 to 8.

* * * * *